(12) United States Patent
Lu

(10) Patent No.: US 7,387,724 B1
(45) Date of Patent: Jun. 17, 2008

(54) FLUID MAGNETIZER

(76) Inventor: Kuo-Hwa Lu, P.O. Box 166-13, Taipei (TW) 115

( * ) Notice: Subject to any disclaimer, the term of this patent is extended or adjusted under 35 U.S.C. 154(b) by 0 days.

(21) Appl. No.: 11/987,583

(22) Filed: Dec. 3, 2007

(51) Int. Cl.
*C02F 1/48* (2006.01)
(52) U.S. Cl. ...................... 210/222; 335/184
(58) Field of Classification Search ........ 210/222–223; 335/284; 123/538
See application file for complete search history.

(56) References Cited

U.S. PATENT DOCUMENTS

| | | | |
|---|---|---|---|
| 4,116,839 A | * | 9/1978 | Unkelbach et al. ......... 210/222 |
| 4,455,228 A | * | 6/1984 | Jones ..................... 210/222 |
| 5,135,720 A | * | 8/1992 | Uchida ..................... 422/107 |
| 5,719,544 A | * | 2/1998 | Vinciarelli et al. ....... 336/84 C |
| 6,720,855 B2 | | 4/2004 | Vicci |

FOREIGN PATENT DOCUMENTS

TW    M247586    10/2004

* cited by examiner

*Primary Examiner*—Ramon M Barrera

(57) ABSTRACT

The invention is to provide a magnetizer induces small particle groups of fluid in pipes or tanks easy for purifying purpose. The fluid magnetizer comprising: a housing (1), at least two electromagnetic (EM) devices (2) in contact with an outer surface of a pipe or tank, the EM device (2) includes a U-shaped magnetic conduit (20) with two solenoids (21) disposed at both ends of the conduit (20), and a power supplier (3) transfers direct current (DC) into alternate current (AC) or directly provides AC for inducing time-varying magnetic flux lines.

5 Claims, 7 Drawing Sheets

FLUID MAGNETIZER

FIELD OF THE INVENTION

The invention is to provide a fluid magnetizer for easy burning or cleaning purposes.

BACKGROUND OF THE INVENTION

Conventional magnetizer (9), as illustrated in FIG. 1, comprises a hollow cylinder housing (90), two pieces of semi-circular magnets (91). Materials went through the housing (1) may be magnetized to increase thermal heat capacity. As described in U.S. Pat. No. 6,720,855 entitled "magnetic flux lines conduit" to Vicci Lendra on Apr. 13, 2004, it said "magnetic flux lines may have a closed electrical path along a lengthwise axis that links closed path of desired magnetic flux lines", thereby, a conventional magnetizer (9) is distributed with magnetic flux lines at high or low density results in an insufficient magnetic strength even limited in a narrower scope. Based on such assumption as above, persons skilled in the art have provided some magnetizer, such as in TWM247586 entitled "Water magnetizer" to Tsai Jr-Feng on Oct. 21, 2004 Tsai taught a water magnetizer characterized by a high frequency electric current supplier produces high frequency electric current to solenoid as a magnetic-field source can also be a source of time-varying magnetic flux lines, whereby water went through the magnetic field can be magnetized. But this magnetizer has some drawbacks as following:
1. Conventional magnetizer is designed easy for water purifying purpose, not for laundering, deodorizing, cleaning or burning purposes.
2. Time-varying magnetic flux lines induced by an electrified solenoid is distributed thereabout with low density, unstable, and out of control. Water went through thereabout is magnetized when a varying magnetic flux lines is induced, where only a portion of water particles can be magnetized. Time-varying magnetic flux lines induced in varying durations of time due to the magnetic field emitted by the solenoid is not always oriented in a specific direction. Further, magnetic flux lines leaking may influence surrounding objects, or magnetize them.
3. Output of the high frequency power source wave should be produced by such as a high voltage power oscillated by an oscillator, the regulated power supplies is more expensive than unregulated power supplies.

SUMMARY OF THE INVENTION

The invention is to provide a magnetizer induces small particle groups of fluid in pipes or tanks easy for purifying purpose. The fluid magnetizer comprising: a housing (1), at least two electromagnetic (EM) devices (2) in contact with an outer surface of a pipe or tank, the EM device (2) includes a U-shaped magnetic conduit (20) with two solenoids (21) disposed at both ends of the conduit (20), and a power supplier (3) transfers direct current (DC) into alternate current (AC) or directly provides AC for inducing time-varying magnetic flux lines.

The housing (1) consists of a first housing (10) and a second housing (11) the two housings are opposite to each other and spatially distributed in balance.

The power supplier (3) produces AC at a frequency is in the range of 50 Hz or 60 Hz.

A voltage of the power supplier (3) is in the range of 20V~220V.

The pipe or tank shielded by the housing (1) can be selected from one of the following: water pipes, oil pipes, coolant pipes, boiler pipes, diesel engine pipes, wash tanks or water tanks.

DETAILED DESCRIPTION OF THE PREFERRED EMBODIMENTS OF THE PRESENT INVENTION

Figure 1:
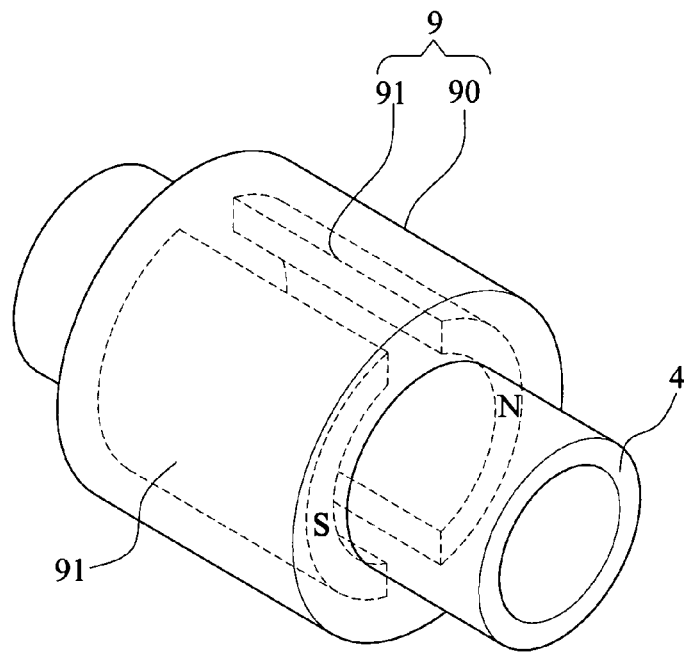
FIG. 1: shows a schematic view of a conventional magnetizer.
Figure 2:
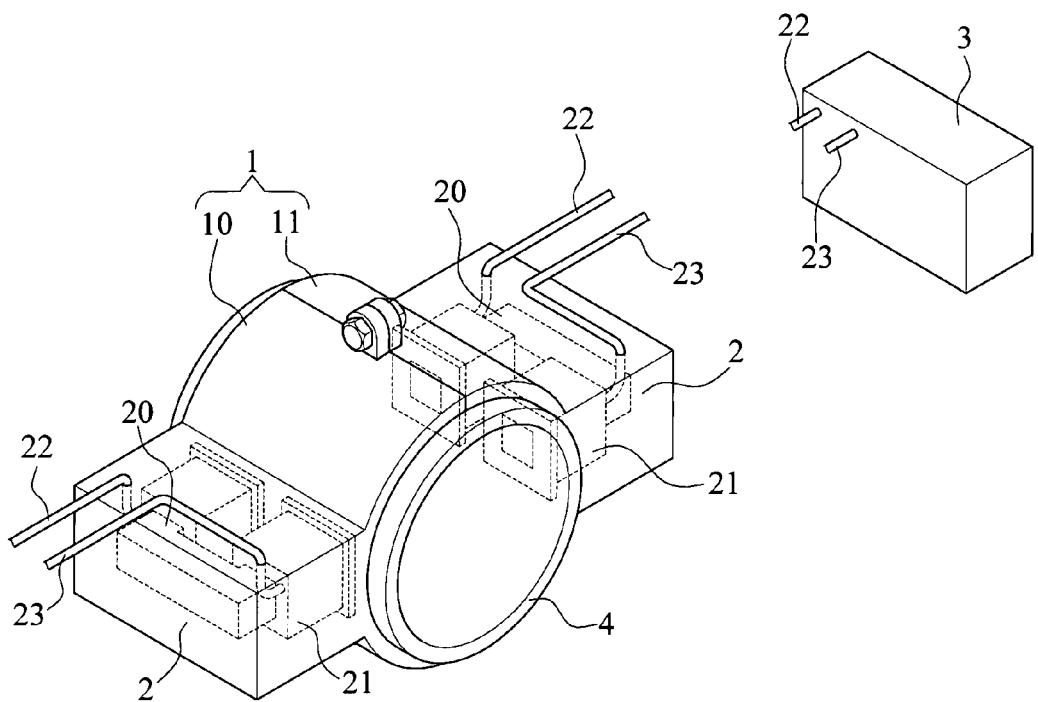
FIG. 2: shows a schematic view of the magnetizer of the first embodiment of the present invention.

Detailed description of the invention is described according to the appended drawings hereinafter.

As shown in FIGS. 2~9, a magnetizer applicable to fluid tanks/pipes characterized in that: a housing (1) disposed outside fluid tanks/pipes; at least, two electromagnetic (EM) devices (2) disposed inside the housing (1) are in contact with outer walls of the fluid tanks/pipes; said EM device (2) includes a U-type conduit (20), whose both ends are disposed with solenoids (21) for inducing magnetic flux lines; and A power supplier (3) electrically connected to the solenoids (21) can transfer direct current (DC) into alternate current (AC), or directly supply AC to the EM devices (2) for emitting magnetic field.

Since the EM devices (2) generate or emit an alternate magnetic field, the EM devices (2), where excitation solenoids (21) at both ends of the U-type conduit (20) induce magnetic field is distributed in symmetry. Magnetic flux lines are also distributed evenly to cause magnetized water particles or particle aggregations transformed into small size.

Since the magnetizer of the present invention is applicable to common fluid tanks/pipes on the market, the magnetizer is easy to install to the tanks/pipes to cause magnetic flux lines under control. Surrounding objects are not influenced or magnetized by leaking magnetic flux.

The housing (1) consists of a first housing (10) and a second housing (11), the two housings are opposite to each other and spatially distributed in balance. The EM devices (2) are stably supported inside the housing (1), where the alternate magnetic field is generated and applied to cause magnetic flux lines distribution evenly within the housing (1).

The power supplier (3) produces AC at a frequency is in the range of 50 Hz or 60 Hz. A common mode of voltage can be applicable to the frequency and voltage of the power source (3) of the present invention. That is easy in use, adjustments to the frequency is not necessary.

A voltage of the power supplier (3) is in the range of 20V~220V. Most voltage regulated power supply on the world is included in the range of 20V~220 V, it is convenient for the magnetizer of the present invention applied to anywhere.

The pipe or tank shielded by the housing (1) can be selected from one of the following: water pipes, oil pipes, coolant pipes, boiler pipes, diesel engine pipes (not shown), wash tanks or water tanks. The magnetizer of the present invention can be added to the tanks/pipes or incorporated to the tanks/pipes integrally as a whole to increase magnetization efficiency as a means plus function. That is convenient for users.

Figure 5:
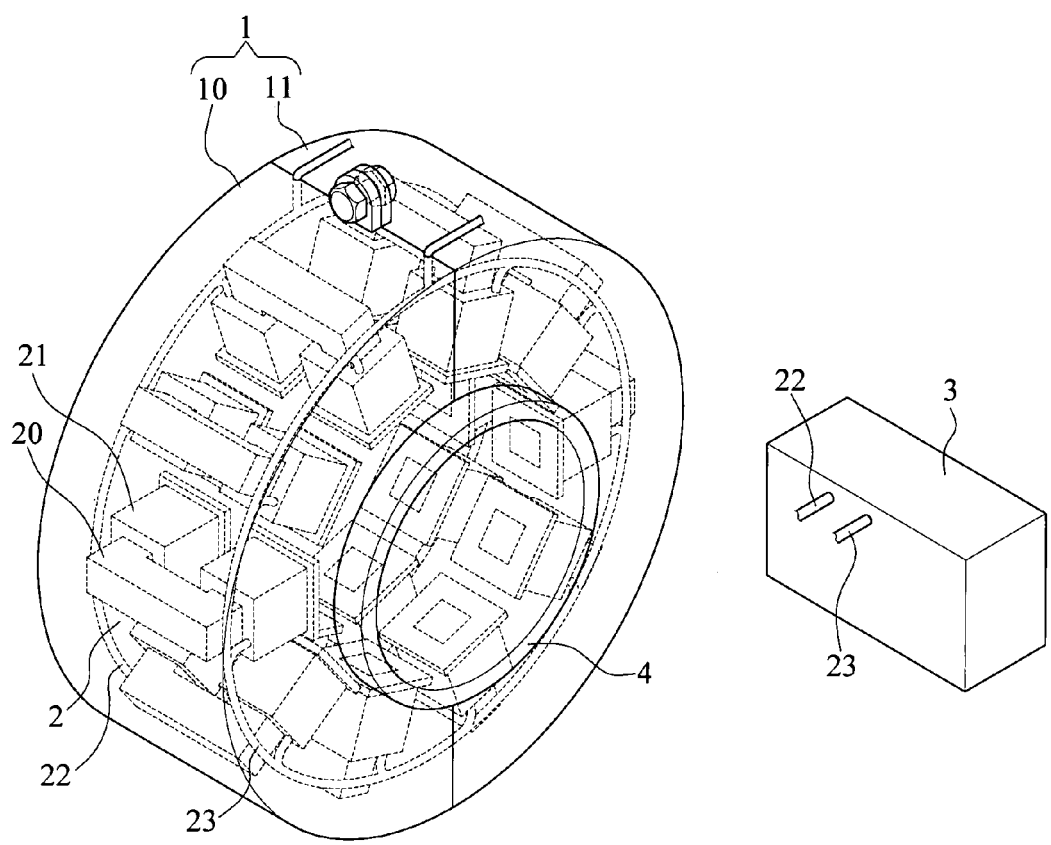
FIG. 5: shows a schematic view of the magnetizer of the second embodiment of the present invention.
Figure 6:
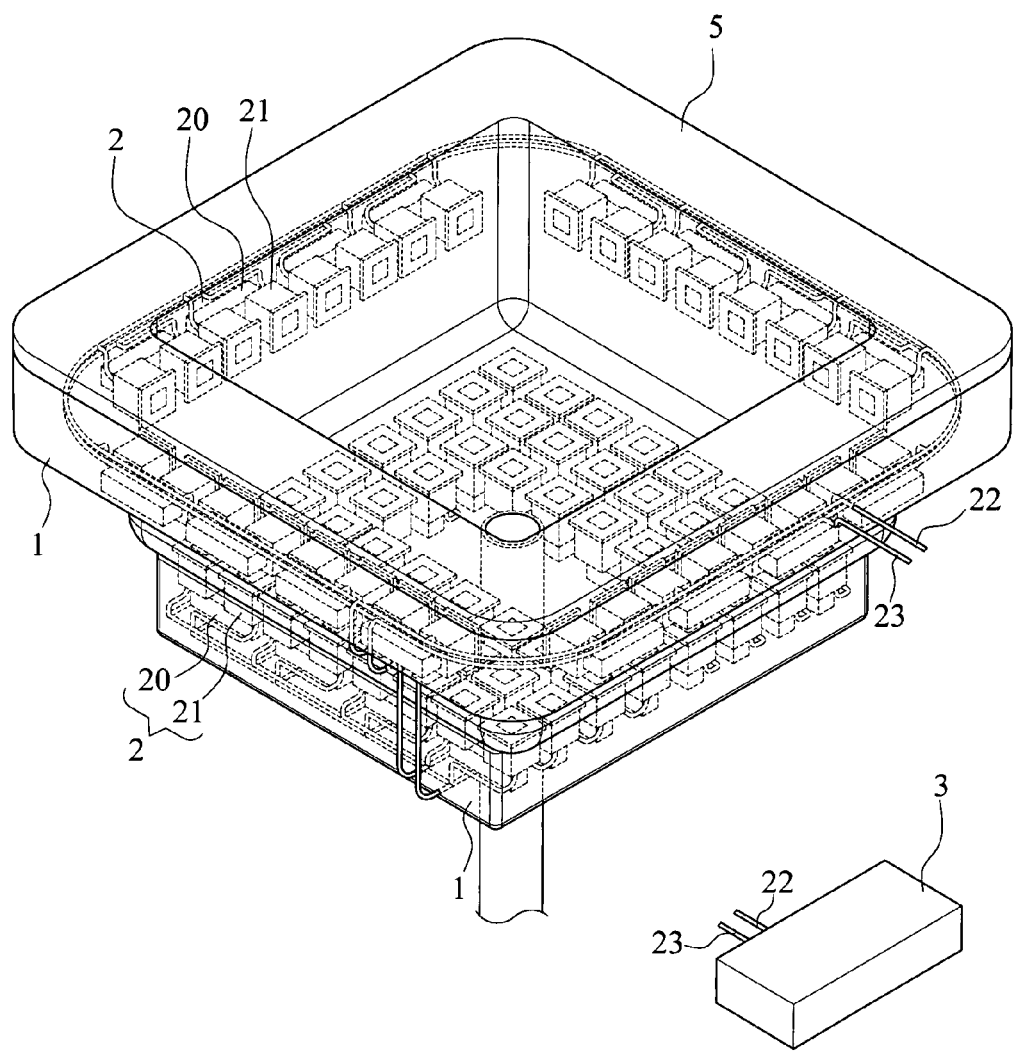
FIG. 6: shows a schematic view the magnetizer of the third embodiment of the present invention.
Figure 7:
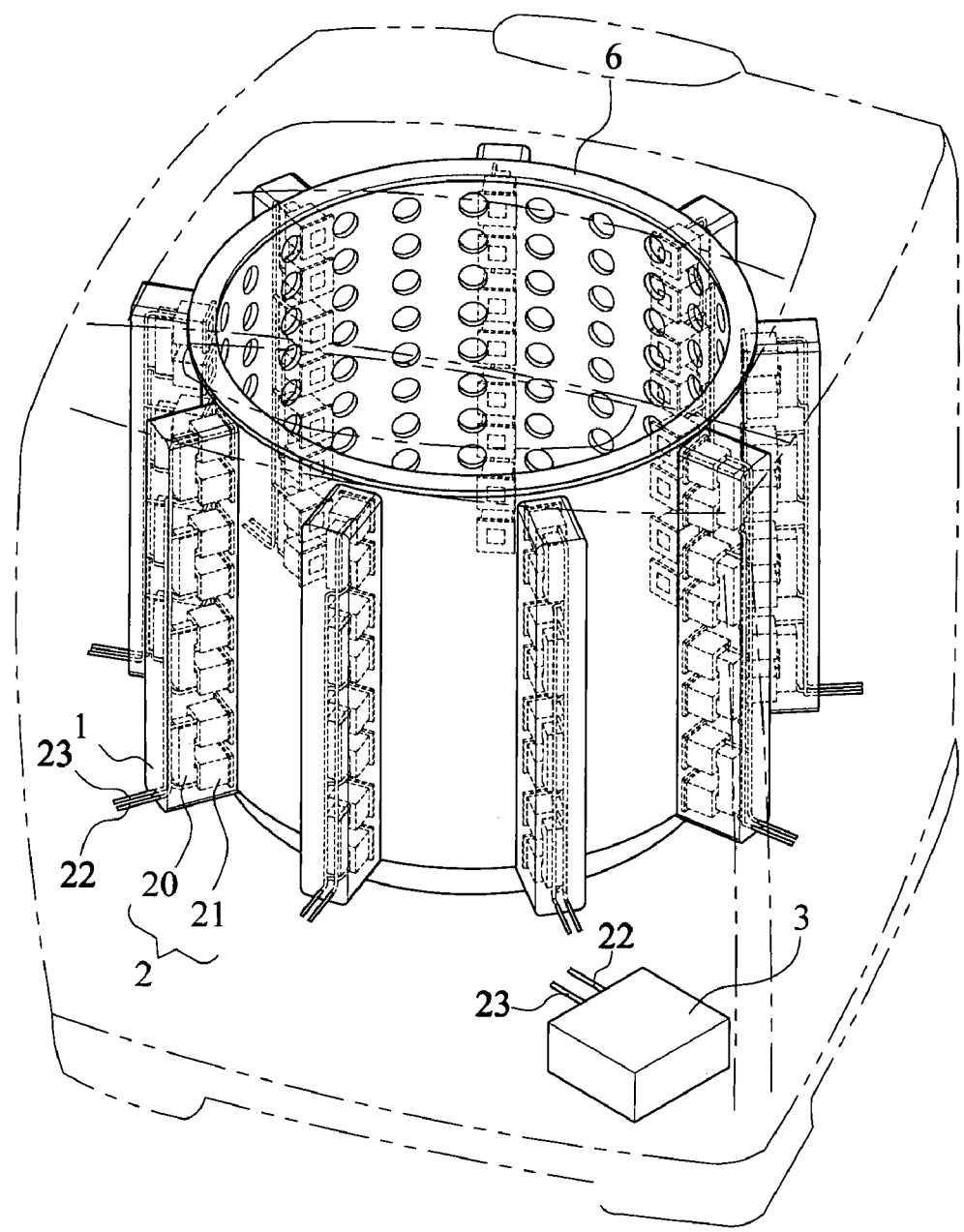
FIG. 7: shows a schematic view of the magnetizer of the fourth embodiment of the present invention.

As shown in FIG. 5, the magnetizer can be added to the water pipes, or as shown in FIG. 6, the magnetizer added to water tank (6), or as shown in FIG. 7, the magnetizer added to wash tank (7), not only for purifying purpose, but also for deodorization or decontamination purposes.

Figures 8, 9:
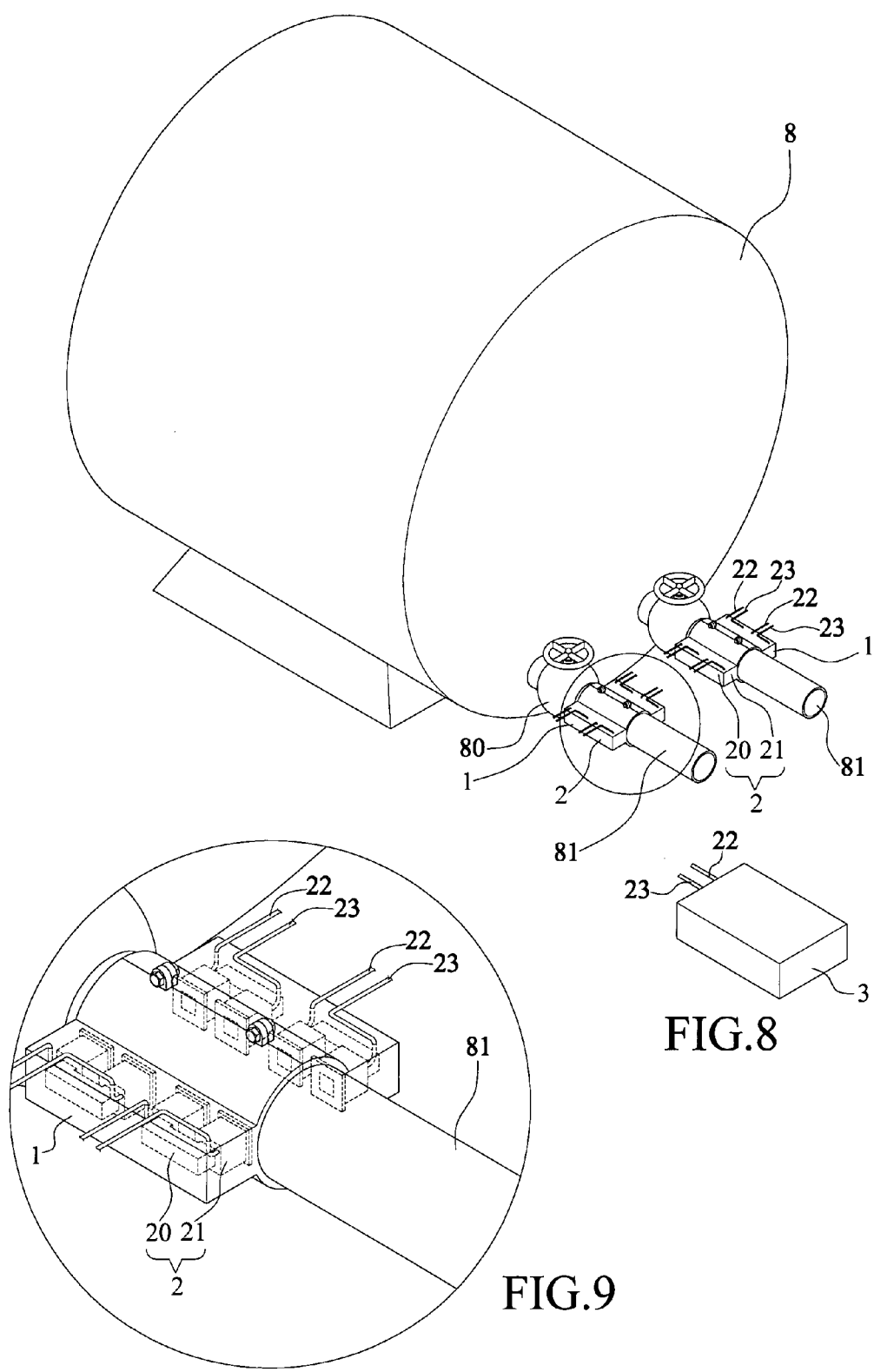
FIG. 8: shows a schematic view of the magnetizer of the fifth embodiment of the present invention.
FIG. 9: shows an enlarged view of FIG. 8 indicated by a circle.

As shown in FIG. 8, the magnetizer can be added to pipes (81) in front of an injection valve (80) of the burner (8) (or oil pipes, coolant pipes) for increasing overall operation efficiency due to magnetized fuel transformed into small size easy for burning purpose can be achieved by the magnetizer of the present invention.

Figure 3:
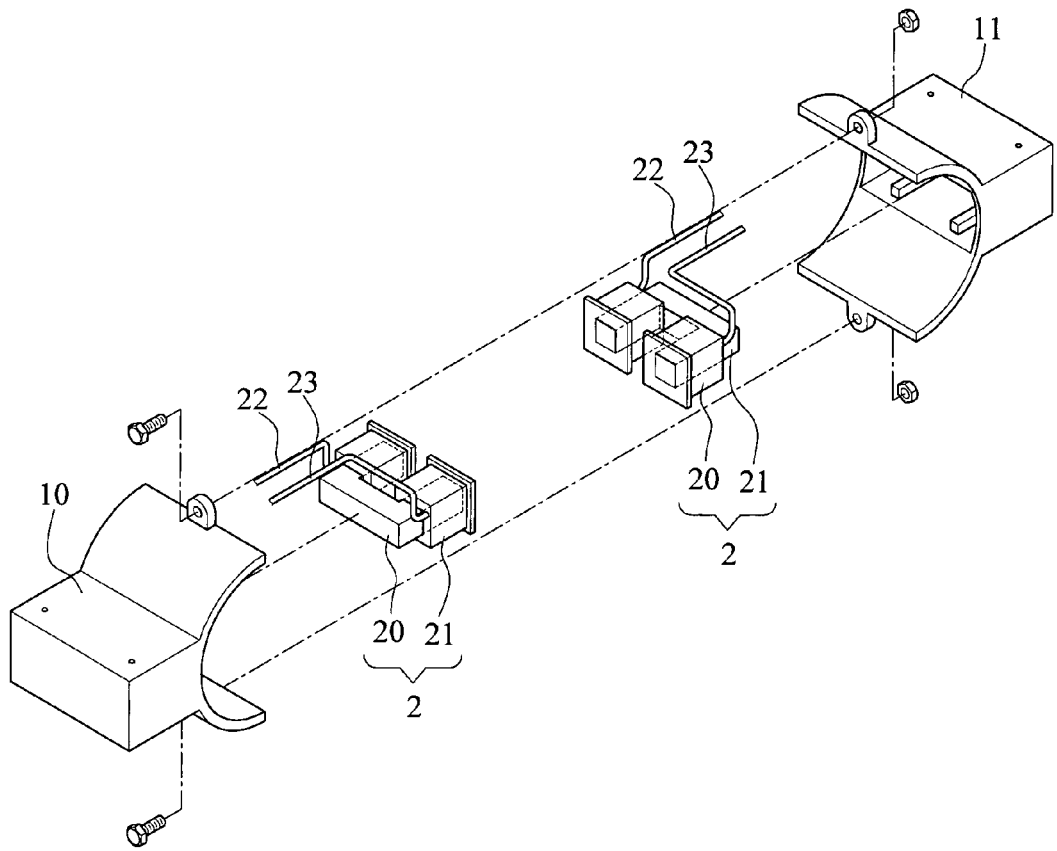
FIG. 3: shows an exploded view of the magnetizer of the first embodiment of the present invention.
Figure 4:
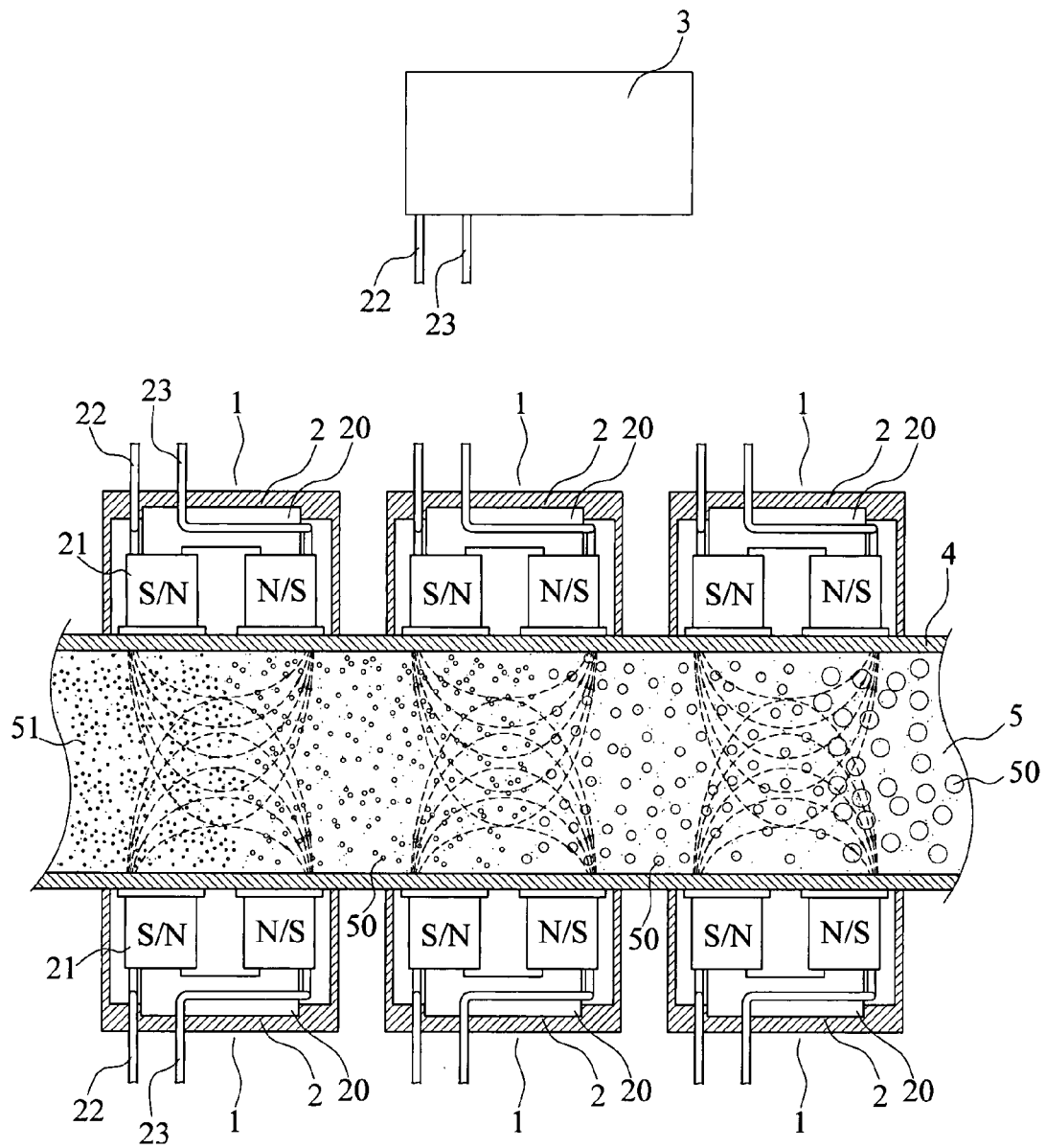
FIG. 4: shows a sectional view of the magnetizer of the first embodiment of the present invention in use.

As shown in FIG. 3, an exploded view of the magnetizer of the first embodiment of the present invention is illustrated. It depicts the EM devices (2) is excited by an excitation AC supplied from the AC power supply (3) to generate alternate magnetic field. As shown in FIG. 4, water particles or particle aggregation (50) of a carrier (5) passed through the EM device (2) alternating South, North polarity 50 times per second or 60 times per second. Whereby magnetic flux lines caused by the alternate magnetic field magnetize the water particles or particle aggregation (50), whose bonds are broken, transformed into small size water particles (51) even shrunk to nano scale with different physical and chemical properties.

For example, when carrier (5) is water, which flow through the alternate magnetic field, particle aggregation $(H_2O)_n$ is magnetized to transform into small size biparticle $(H_2O)_2$ or monoparticle (H2O). After magnetization, an angle of oxyhydrogen bond is reduced from 104.5° to 103°. Magnetic moment between oxygen atom and hydrogen atoms are oriented in a different direction, so the water aggregation is magnetized and transformed into discrete biparticles $(H_2O)_2$ or monoparticle $H_2O$. Rheological properties of $H_2O$ are therefore changed. Magnetized water particles transformed into small size biparticle or monoparticle by the alternate magnetic field, due to the size of biparticle or monoparticle etc., are smaller than usual water particles or particle aggregation. The magnetized water can be applied to clean objects, likely a surfactant or cleaner but without any contamination.

When the carrier is specified as diesel, because magnetized diesel aggregation turned into small size particle, diesel engine combustion efficiency can be increased. Even water contained in the diesel can be magnetized. To meet demands of eco-awareness, wherein magnetized water particles or particle aggregation turned into small size particles, combustion efficiency of diesel can be increased to approach 100%, emission of carbon dioxide etc., can also be reduced.

When the carrier is specified as coolant, magnetized coolant particle aggregation turned into small size particles, coolant flows through refrigeration cycle is easily retained high thermal capacity. Work required to be done by a load compressor of the refrigeration cycle can be reduced.

When the carrier is specified as air, magnetized air particle aggregation turned into small size ions with negative charges. On the market, so called negative ion generator is operated in high voltage mode accompanied by an amount of ozone air pollution caused adverse health effects to most people. Such problems can be improved, when using magnetizer of the present invention or the like.

ADVANTAGES OF EMBODIMENTS OF THE PRESENT INVENTION

1. Electromagnetic (EM) device (2) creates time-varying magnetic flux lines, the EM device (2) comprising a U shape conduit (20) and two solenoids (21) disposed at both ends of the conduit (20) emit magnetic field, which turns time-varying magnetic flux lines distribution thereabout with a high density. Magnetized water particles or particle aggregation are therefore transformed into small size particle groups.

2. A common mode of voltage can be applicable to the frequency and voltage of the power source (3) of the present invention.

3. The magnetizer of the present invention is applicable to common fluid tanks/pipes on the market.

What is claim is:

1. A fluid magnetizer comprising: a housing (1), at least two electromagnetic (EM) devices (2) in contact with an outer surface of a pipe or tank, the EM device (2) includes a U-shaped magnetic conduit (20) with two solenoids (21) disposed at both ends of the conduit (20), and a power supplier (3) transfers direct current (DC) into alternate current (AC) or directly provides AC for inducing time-varying magnetic flux lines.

2. The fluid magnetizer of claim 1 wherein the housing (1) consists of a first housing (10) and a second housing (11) the two housings are opposite to each other and spatially distributed in balance.

3. The fluid magnetizer of claim 1 wherein the power supplier (3) produces AC at a frequency is in the range of 50 Hz or 60 Hz.

4. The fluid magnetizer of claim 1 wherein a voltage of the power supplier (3) is in the range of 20V~220V.

5. The fluid magnetizer of claim 1 wherein the pipe or tank shielded by the housing (1) can be selected from one of the following: water pipes, oil pipes, coolant pipes, boiler pipes, diesel engine pipes, wash tanks or water tanks.

* * * * *